H. DYER.
Hand Planter.
No. 106,568. Patented Aug. 23, 1870.
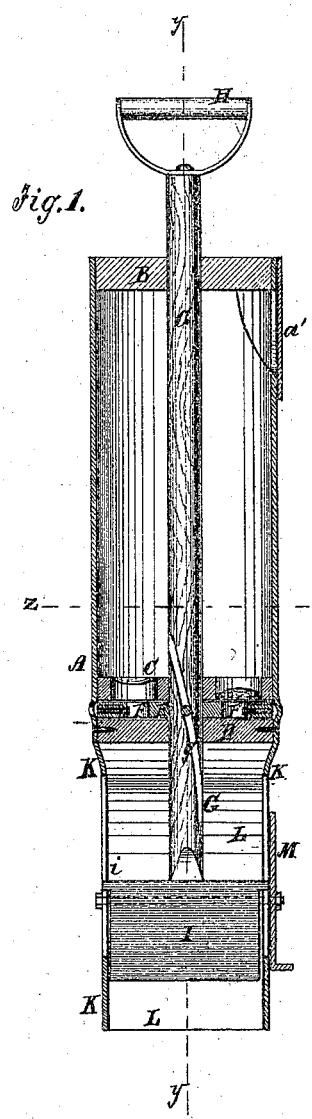
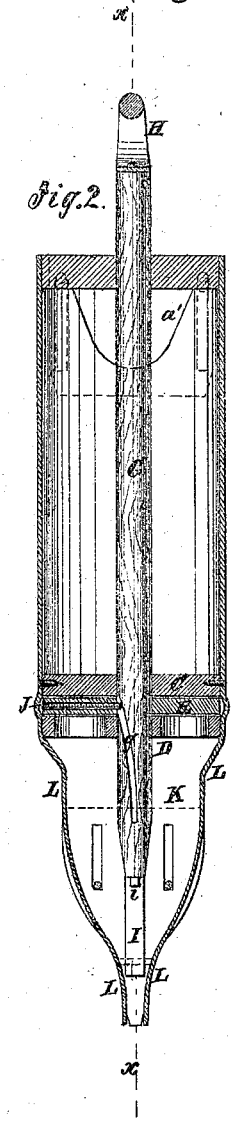
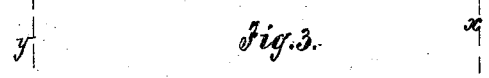
Witnesses:
A. Benzendorf
S. S. Mabee
Inventor:
H. Dyer
per [signature] Attorneys.

UNITED STATES PATENT OFFICE.

HUGH DYER, OF FORT SCOTT, KANSAS.

Letters Patent No. 106,568, dated August 23, 1870.

IMPROVEMENT IN HAND CORN-PLANTER.

The Schedule referred to in these Letters Patent and making part of the same.

*To all whom it may concern:*

Be it known that I, HUGH DYER, of Fort Scott, in the county of Bourbon and State of Kansas, have invented a new and useful Improvement in Hand Corn-Planter; and I do hereby declare that the following is a full, clear, and exact description thereof, which will enable others skilled in the art to make and use the same, reference being had to the accompanying drawing forming part of this specification.

Figure 1 is a detail longitudinal section of my improved hand corn-planter, taken through the line $x\,x$, fig. 2.

Figure 2 is a detail longitudinal section of the same, taken through the line $y\,y$, fig. 1.

Figure 3 is a detail cross-section of the same, taken through the line $z\,z$, fig. 1.

Similar letters of reference indicate corresponding parts.

My invention relates to hand corn-planters, and consists in certain improvements which will first be described in connection with all that is necessary to a clear understanding thereof, and then clearly specified in the summary or claim.

A is the body or case of the machine, which is made of light sheet metal, galvanized, or otherwise secured from rusting. The body A is made cylindrical in form, and of convenient size and length.

In the side of the upper part of the body A is formed an opening, for convenience in putting in the seed, which opening is closed with a sliding door, $a'$.

The upper end of the body A is closed by a disk, B, fitted into it, and secured by screws passing into its edge through holes in the said body A.

In the lower end of the body A are secured two disks, C D, at such a distance apart as to allow the dropping disk E to be placed between them.

Two holes for the passage of the seed are formed in each of the disks C D, and the disks are so arranged that the said holes will not be directly over each other, as shown in fig. 3.

In the oscillating or dropping-disk E are formed two holes, corresponding in position with the holes in the two disks, C D, so that the said holes, which are of such a size as to contain enough seed to form a hill, may receive seed from the holes in the upper disk, C, and convey it to the holes in the lower disk, D, through which it drops into the lower part of the machine.

The lower side of the disk C, in front of the holes through it, is recessed, and in the recesses thus formed are placed pieces of sponge, or other elastic and yielding material, to prevent any more seed than enough to fill the holes in the disk E from being carried out by the said disk, and also to prevent the seed from being injured by being carried beneath the said disk C.

The oscillating disk E may be adjusted in size as required by the gauges F, placed in them, and operated by set-screws passing in through the said disk E, and which may be reached and operated through holes in the sides of the body A.

Through the center of the four disks, B C D E, are formed round holes, for the passage of the plunger-shaft G, which has a handle, H, secured to its upper end, and to the lower end of which is attached the plunger I.

In the side of the part of the shaft G that moves up and down through the three disks, C E D, is formed a spiral groove, $g'$, making about half a turn around the said shaft G, and extending the length of a stroke.

The groove $g'$ should be lined with metal, to prevent wear; and in it works the point of the screw J, which passes in through the edge of the disk E, as shown in fig. 2, so that the said disk E may be oscillated to drop the seed by the up-and-down movement of the plunger-shaft.

To the opposite sides of the lower end of the body A are attached the upper ends of the plates K, which taper to, or nearly to a point at their lower ends, and the edges of which may be upon a straight or curved line, as may be desired. The latter I prefer, as it gives more space for the seed to drop past the plunger I.

To the lower end of the body A, between the upper ends of the plates K, are attached the elastic plates L, which are curved to correspond with the shape of the edges of the plates K, and the lower ends of which meet, so as to make the lower edge of the planter wedge-shaped, to enable it to be readily forced into the ground.

The plunger I is a thick plate, upon the upper parts of the end edges of which are formed projections or lugs $i'$, which pass through and work in vertical slots in the middle parts of the plates K, as shown in fig. 1, to guide the plunger I, and limit its up-and-down movement.

M is a plate or step, having a flange formed upon its lower end, to serve as a gauge or stop, to regulate the depth to which the planter enters the ground, and which is adjustably secured to the plates K by bolts passing through the plates K and M, one or the other of which plates is slotted, so that the gauges or stops may be adjusted to allow the planter to enter the ground more or less, as may be required.

By this construction, as the seed is dropped through the disks C D E, by the movement of the plunger-shaft G, it falls into the lower part of the chamber formed by the plates K L, below the plunger I, and, as the said plunger is forced down after the planter has been thrust into the ground to the required depth, the said seed is allowed to drop out into the hole in the ground, by the spring plates L being forced apart by the said downward movement of the said plunger I.

Having thus described my invention,

I claim as new and desire to secure by Letters Patent—

1. The combination of the oscillating disk E and adjustable gauges F, arranged between the disks C D, as and for the purpose described.

2. The combination of disk E with screw J and spirally-channeled shaft G, as and for the purpose described.

HUGH DYER.

Witnesses:
W. J. REEDSHAW,
JOHN PERRY.